United States Patent
Oscar et al.

(10) Patent No.: US 11,909,184 B2
(45) Date of Patent: Feb. 20, 2024

(54) ROLLER UNIT FOR LAYING CABLES IN A PLANT FOR LAYING CABLES AND PLANT FOR LAYING CABLES COMPRISING THE ROLLER UNIT

(71) Applicant: TESMEC S.P.A., Milan (IT)

(72) Inventors: Alberto Oscar, Castro (IT); Stefano Osio, Treviolo (IT); Fabrizio Parodi, Presezzo (IT)

(73) Assignee: TESMEC S.P.A. (IT)

( * ) Notice: Subject to any disclaimer, the term of this patent is extended or adjusted under 35 U.S.C. 154(b) by 639 days.

(21) Appl. No.: 16/973,918

(22) PCT Filed: Jun. 20, 2019

(86) PCT No.: PCT/IT2019/050149
§ 371 (c)(1),
(2) Date: Dec. 10, 2020

(87) PCT Pub. No.: WO2019/244191
PCT Pub. Date: Dec. 26, 2019

(65) Prior Publication Data
US 2021/0273423 A1 Sep. 2, 2021

(30) Foreign Application Priority Data
Jun. 20, 2018 (IT) .......................... 102018000006503

(51) Int. Cl.
*H02G 1/04* (2006.01)
(52) U.S. Cl.
CPC ..................................... *H02G 1/04* (2013.01)
(58) Field of Classification Search
CPC .......... F16H 55/44; F16H 55/48; F16H 55/50; H02G 1/04; H02G 7/00; H02G 7/02; H02G 7/04; H02G 7/05; H02G 7/20
See application file for complete search history.

(56) References Cited

U.S. PATENT DOCUMENTS

| 411,761 A | * | 9/1889 | Davies | .................... F16H 55/50 |
| | | | | 474/176 |
| 3,853,304 A | * | 12/1974 | Jackson | .................... H02G 1/04 |
| | | | | 174/41 |

(Continued)

FOREIGN PATENT DOCUMENTS

| AT | 292826 B | * 12/1968 |
| CN | 101582571 | 11/2009 |

(Continued)

OTHER PUBLICATIONS

OMAC Pulley Blocks; OMAC Pulley 7 Block, Equipment, 17 pages.

(Continued)

*Primary Examiner* — Tyrone V Hall, Jr.
(74) *Attorney, Agent, or Firm* — BakerHostetler

(57) ABSTRACT

Roller unit for laying cables (11, 12, 13), comprising a frame (23, 23') where at least one pair of sliders (25, 25') are positioned aligned parallel to a laying direction (S1, S2) of the cables (11, 12, 13) and each provided with at least one pair of wheels (28, 28a, 28b) supporting a cable (11, 12, 13) to be laid; said sliders (25, 25') are hinged to said frame (23, 23') and rotatable around respective axes of rotation (A, A') so as to vary the inclination thereof with respect to said frame (23, 23') and therefore to vary the radius of curvature of the cable (11, 12, 13) supported; said wheels (28, 28a, 28b) are provided with an annular groove (32) to support the cables, delimited by containing wings (33) and able to define a contact and sliding surface of at least one of said cables (11, 12, 13), wherein at least said annular support groove (32) is made of or covered by a technoplastic material with polyamide (PA) base reinforced with glass fiber, if the supported cable is a conductor (11, 13), or by means of a metal material of great hardness, in particular pearlitic- (Continued)

ferritic lamellar cast iron GJL250, if the supported cable is a towing cable (12).

11 Claims, 4 Drawing Sheets

(56) References Cited

U.S. PATENT DOCUMENTS

| | | | |
|---|---|---|---|
| 2010/0227972 A1* | 9/2010 | Katayama | C08J 5/043 524/606 |
| 2015/0121702 A1* | 5/2015 | Wang | F16H 55/36 29/892.3 |

FOREIGN PATENT DOCUMENTS

| | | | | |
|---|---|---|---|---|
| EP | 1231097 A1 * | 8/2002 | | B60M 1/28 |
| EP | 1231097 A1 | 8/2002 | | |
| JP | 2008202693 A * | 9/2008 | | |

OTHER PUBLICATIONS

TESMEC Additional Devices; 44 pages.
Tupy Continuous Cast Iron Bar Stock; 2 pages.
Cambridge Materials Data Book; Cambridge University Engineering Department; 2003 Edition; 41 pages.
Koster Winches; 29 pages.

* cited by examiner

ROLLER UNIT FOR LAYING CABLES IN A PLANT FOR LAYING CABLES AND PLANT FOR LAYING CABLES COMPRISING THE ROLLER UNIT

CROSS-REFERENCE TO RELATED APPLICATIONS

This application is the National Stage of International Patent Application No. PCT/IT2019/050149, filed Jun. 20, 2019, which claims priority to Italian Application No. 102018000006503, filed Jun. 20, 2018, the disclosures of which are incorporated herein by reference in their entirety.

FIELD OF THE INVENTION

The present invention concerns a roller unit for laying cables, such as for example electrical conductors, ropes, optical fibers, or suchlike, or for replacing them, in a plant for laying cables, and also concerns a plant for laying cables comprising the roller unit.

In particular, the present invention concerns a roller unit usable in a plant for laying, for example, a high voltage overhead electric line and in general overhead lines which provide the so-called "braked" laying of such cables.

BACKGROUND OF THE INVENTION

It is known that the laying of cables of overhead electric lines, data distribution lines, or others, is performed with plants that achieve the principle of "braked stretching", where one or more "winch" machines recover one or more cables or old conductors to be replaced and one or more "braking" machines perform the braking of the new conductors in the process of being laid to guarantee a geometric configuration in the span that avoids interferences with natural and/or artificial obstacles. These plants therefore perform the controlled laying and stretching of such cables.

In particular, the laying plants above provide a machine with a winch function configured to recover a cable, or a steel cable, with a towing function, by winding the latter onto a respective pair of traction drums or capstans. The laying plants above comprise, on the other end of the line to be laid, a machine with a brake function configured to control the unwinding tension of the cable or cables to be laid by winding it onto the respective pair of unwinding capstans where the cable is drawn, for example, by the action of the winch machine.

In particular, the braking machine exerts a controlled tension on the cables in the process of being laid to guarantee that they can remain suspended on suitable guide devices provided on intermediate supports and are disposed according to the configuration of the suspended catenary with controlled inflection. In this way, the cables do not slide on the ground and remain distant from possible obstacles present under the cables themselves, such as for example road or rail crossings, intersection of other electric lines, etc.

To lay the cables, pilot towing cables, or the same electric cables to be replaced that are already present on the lines, are normally used.

The laying machines comprise two or more combined pairs of capstans, on which the cables are wound: if the cable is pulled the stretcher is used as a winch, while if the cable is braked by the action of the capstan itself, the stretcher is used as a brake to regulate the correct tension of the cable during the stretching.

The suitable guide devices provided on intermediate supports, for example pylons, are typically represented by supports consisting of a series of pulleys, all rotating idly around a common axis, and on which initially the towing cables and subsequently the conductors slide. When the conductor cables have reached the required tension, they are removed from the groove of the corresponding support pulley and clamped in the definitive position.

The minimum diameter of the pulleys is set by the regulations in force as a function of the diameter of the conductor, typically 20 times the diameter of the conductor, and therefore the sizes of the pulleys can reach considerable sizes. In fact, the regulations aim to avoid the use of pulleys of reduced diameter, which would favor stretching operations, but which would damage the conductor due to the inflection that generates high surface pressure between the grooves of the pulley and the cable itself. In practice, the choice of pulley is made by balancing the need for practicality with the need not to ruin the cable already during mounting.

In more recent times, in order to avoid the flattening stresses of the conductor concentrating on the grooves of the pulleys, as well as to avoid folding angles that would compromise the mechanical resistance of the conductor, so-called roller units are used, that is, a plurality of rollers disposed in an arc of a circle, which defines the equivalent geometric work arc of the roller units.

However, the geometric work arc of the roller unit above has a fixed value, therefore defined during the construction step, therefore the roller unit proves to be not very flexible with regard to the functioning and usage modes.

To at least partly resolve this problem there are also roller units which comprise an oscillating frame, also with several sliders, so as to have a possibility of varying the work geometry, depending on the loads applied and on the geometric configurations of the catenary of the conductor during the work steps.

Although they solve the problem of being able to vary the work geometry and avoid having to use pulleys with a large diameter, these roller units with oscillating frame have a decidedly higher speed of rotation of the rollers or wheels compared to a traditional pulley, therefore the material with which these pulleys are normally made tends to wear out easily, compromising the correct functioning of the roller unit and requiring frequent maintenance operations of the roller unit or replacement of the elements thereof.

Traditional roller units, and in particular the grooves on which the cables and/or the conductors run, can be made for example based on technoplastic materials, such as for example polyamide materials such as polyamide PA66 for example. These materials, as we said, suffer from early wear phenomena due above all to the speed of rotation of the wheels of the roller units and therefore do not guarantee the necessary resistance and efficiency over time.

It is also known that, normally, the materials with which the grooves of the roller units are made, both in the case of towing cables and in the case of conductors, of soft materials, such as rubber or polyamides having a hardness not exceeding 72-75 Shore D (dry as molded) or 60-63 Shore D (conditioned at 23° C. and 50% relative humidity), an elastic modulus not exceeding 2000 Mpa (dry as molded), and characterized by a high friction coefficient.

The combination of material with low hardness and high friction generates high torsional stresses in the supported cables, therefore for example conductors or cables, sometimes such as to generate breakages in the cables themselves.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore the need to perfect a roller unit for laying cables and therefore a plant for laying cables that can overcome at least one of the disadvantages of the state of the art.

One purpose of the present invention is to provide a roller unit for laying cables which provides sliding wheels for the supported cables made of materials with high durability and resistance, even for high speeds of rotation of said wheels, so as to allow an extreme flexibility of use of the roller unit and the possibility of always using it with the best possible surface, improving its efficiency and reducing the possibility of making, on the external surface of the cable to be supported, any possible traces of abrasion or crushing deriving from a surface that is not perfectly smooth and homogeneous.

In particular, one purpose of the invention is to provide a roller unit for laying cables which provides to use a material with high efficiency, wear resistance and durability both in the case where the supported cable is a conductor, and also in the case where the supported cable is a towing cable.

Another purpose of the present invention is to provide a roller unit for laying cables which therefore avoids frequent and unwanted maintenance or replacement operations of the wheels of the roller unit due to the wear of the materials with which they are made, as happens in traditional roller units.

Another purpose of the present invention is to provide a stretching plant in which the laying of the cables takes place efficiently, in which the cables can be laid precisely and by using laying roller units which have high resistance and durability even at high speeds of rotation of the respective sliding wheels of the cable.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the invention or variants to the main inventive idea.

In accordance with the above purposes, one object of the invention is a roller unit for laying cables comprising a frame in which at least one pair of sliders are positioned, aligned parallel to a laying direction of the cables and each provided with at least one pair of support wheels of a cable to be laid; the sliders are hinged to the frame and can be rotated around respective axes of rotation so as to vary their inclination with respect to the frame and therefore to vary the radius of curvature of the supported cable.

According to one aspect of the invention, the wheels are provided with an annular support groove for the cables delimited by containing wings and able to define a contact and sliding surface of at least one of the cables, in which at least said annular support groove is made of or covered by a material with great hardness and low rolling friction: in the case of plastic materials, we consider a minimum hardness of 90 Shore D (dry as molded) or 75 Shore D (conditioned at 23° C. and 50% relative humidity) and an elastic modulus not less than 5000 Mpa (dry as molded); in the case of metal materials we consider a minimum hardness of 210 HB.

Advantageously, by using this type of material, it is possible to reach an adequate compromise between wear of the material and behaviour on the conductor, ensuring high resistance and durability for the sliding surfaces of the cables, so that the wheels of the roller unit can have high support efficiency and flexibility of use even for prolonged periods, without requiring frequent maintenance or replacement.

The annular groove made or covered by a material with these characteristics guarantees a better treatment of the external layer of the conductor or of the cable, due to the reduced friction coefficient, which allows the conductor or the cable to settle more easily on the bottom of the groove in the event of a misalignment between the groove and conductor. In fact, materials with lower hardness can generate a torsional stress in the conductor that can cause it to break.

Moreover, considering the specific contact pressure between conductor and groove of the roller units, it is possible to demonstrate with mathematical calculations that the specific internal pressure between the individual elementary wires of the conductor (for example the external layer and the underlying layer) is from 1.5 to 4 times greater than the contact pressure between the external layer of the conductor and the groove of the roller units, therefore the choice of the material with great hardness for the annular groove does not compromise the integrity of the cable.

According to further aspects of the invention, the annular groove is made of or covered by a technoplastic material with a polyamide base reinforced with glass fiber, in the case where the supported cable is a conductor.

In this case, the specific internal pressure between the individual elementary wires of the conductor (for example the external layer and the underlying layer) is about 4 times greater than the contact pressure between the external layer of the conductor and the groove of the roller units.

Advantageously, if the supported cable is a conductor, by using a material based on polyamide reinforced with glass fiber, it is possible to guarantee high resistance and durability for the sliding surfaces of the cables on the wheels of the roller unit, in such a way that the wheels of the roller unit can have high cable support efficiency and flexibility of use even for prolonged periods, without requiring frequent maintenance or replacement.

The technoplastic material with polyamide (PA) base can be reinforced with a percentage of glass fiber varying between 20% and 40% in weight and preferably equal to about 30%.

According to further aspects of the invention, the annular groove is made or covered by a metal material with great hardness, in the case where the supported cable is a towing cable. A particularly effective metal material with great hardness is pearlitic-ferritic lamellar cast iron GJL250.

In this case, the specific internal pressure between the individual elementary wires of the cable (for example the external layer and the underlying layer) is about 1.5 times greater than the contact pressure between the external layer of the cable and the groove of the roller units.

Advantageously, by using a material based on pearlitic-ferritic lamellar cast iron GJL250, if the supported cable is a towing cable, it is possible to guarantee high resistance and durability for the sliding surfaces of the towing cables on the central wheels of the roller unit, in such a way that the wheels of the roller unit can have high efficiency in supporting the towing cables and flexibility of use even for prolonged periods, without requiring frequent maintenance or replacement.

The annular groove of the wheels can be made of or covered by a plurality of interchangeable sectors made of said material with great hardness and low rolling friction.

The roller unit can comprise two interchangeable sectors of semicircular shape which, once assembled on the wheel, form or cover the annular groove.

The roller unit can comprise a plurality of pairs of sliders disposed adjacent, in which each pair of the sliders is aligned parallel to a laying direction and is able to support at least one cable to be stretched.

The roller unit can comprise three or five pairs of aligned sliders, in which the wheels of the pair of central sliders support a towing cable and the wheels of the pairs of lateral sliders support the respective conductors.

The annular grooves of the wheels of the pair of central sliders can be made of or covered by pearlitic-ferritic lamellar cast iron GJL250, while the annular grooves of the wheels of the pairs of lateral sliders that support respective conductors can be made of or covered by said technoplastic material with a polyamide (PA) base and reinforced with glass fiber.

The roller unit can comprise between the pair of sliders at least one further laying wheel with an earthing function, provided with an annular groove made of or covered by a conductive material, such as pure aluminum or more advantageously aluminum alloy.

A further purpose of the present invention is a plant for laying cables, comprising at least a winch machine and at least a braking machine positioned on opposite sides with respect to one or more intermediate supports, on which one or more roller units for laying cables as defined above are positioned.

These and other aspects, characteristics and advantages of the present disclosure will be better understood with reference to the following description, drawings and attached claims. The drawings, which are integrated and form part of the present description, show some embodiments of the present invention, and together with the description, are intended to describe the principles of the disclosure.

The various aspects and characteristics described in the present description can be applied individually, where possible. These individual aspects, for example aspects and characteristics present in the description or in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example, with reference to the attached drawings wherein.

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

Figure 1:
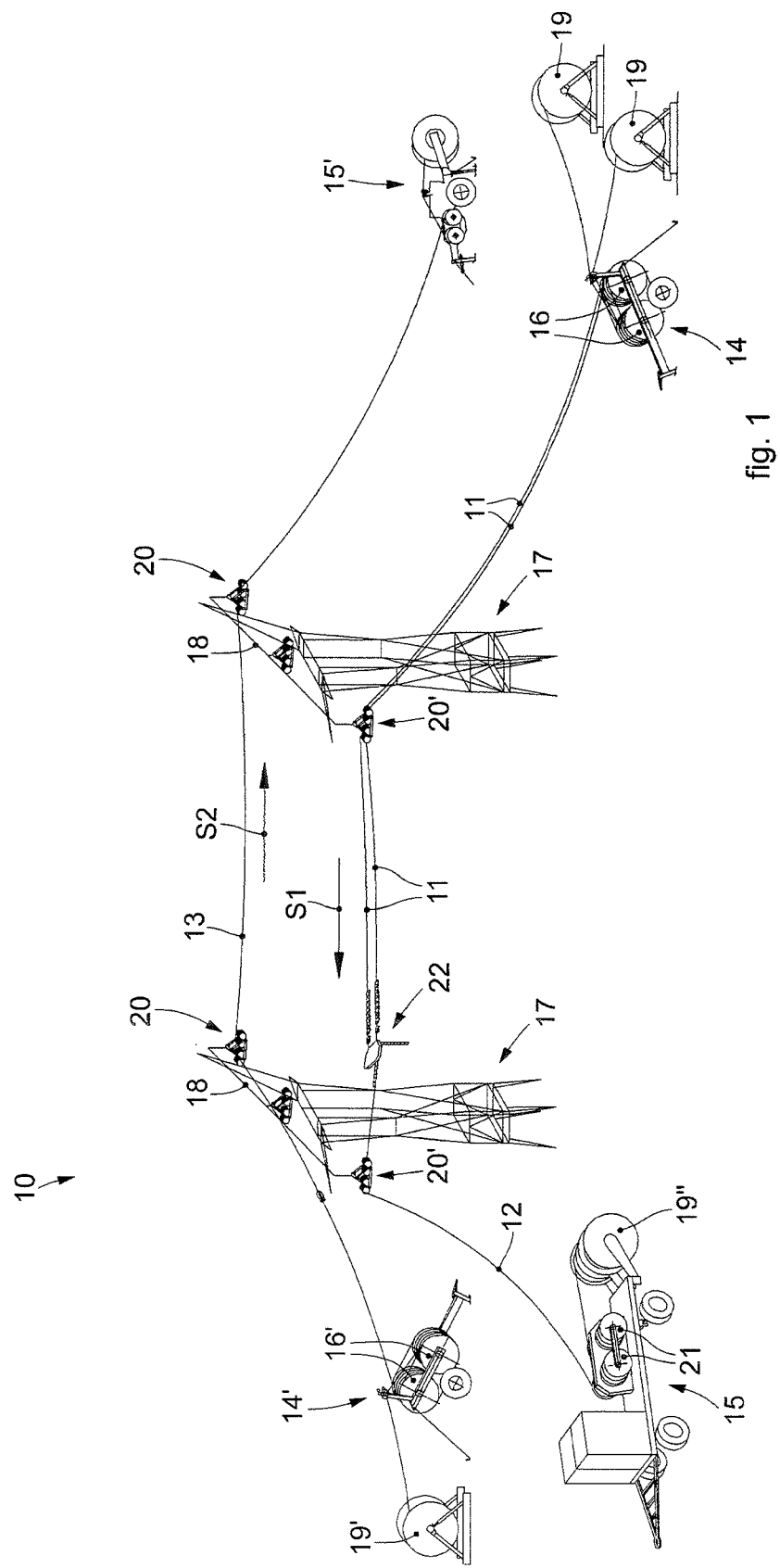
FIG. 1 is a schematic view of a plant for laying cables according to the invention.

With reference to the attached drawings, FIG. 1 shows a laying plant 10 according to the present invention, configured to lay cables 11, 12, 13, that is, for example, a pair of conductors 11, by means of, in this case, a towing cable 12, or to lay a pilot cable 13.

The laying plant 10 comprises, to lay the conductors 11, at least one braking machine 14, provided with one or more unwinding members, or capstans 16, and at least one winch machine 15.

Similarly, the laying plant 10 comprises, to lay the pilot cable 13, at least one braking machine 14', provided with one or more unwinding members, or capstans 16', and at least one winch machine 15'.

The braking machines 14, 14' and the winch machines 15, 15' could also be of the winch-brake type, that is, combined to selectively perform both the winch function and also the braking function.

The braking machines 14, 14' and the winch machines 15, 15' are positioned on opposite sides with respect to intermediate supports 17, for example pylons, on which the cables 11, 12, 13 are laid.

On the intermediate supports 17, as can be seen, the cables 11, 12, 13 are laid on a plurality of roller units 20, 20' according to the present invention.

The roller units 20, 20' can be positioned at a certain height from the ground and are attached, preferably in a removable manner, to support elements 18 provided on the intermediate supports, for example beams, steel section bars or suchlike.

The support elements 18 can be directed transversely with respect to the laying directions S1 and S2 of the cables 11, 12, 13 and several aligned roller units 20, 20' can be positioned on them.

On the braking machine 14, the conductors 11 are fed by respective reels 19 disposed upstream of the respective pairs of capstans 16.

The winch machine 15 is also provided with corresponding capstans 21 and the towing cable 12 is wound on each of them and is then collected in a reel 19".

The towing cable 12 has its end firmly connected to a return device 22, to which the conductors 11 are connected on the opposite side, being laid in the direction S1 by the winch machine 15 and coming from the pairs of capstans 16 of the corresponding braking machine 14.

The pilot cable 13 is instead picked up from a reel 19' located upstream of the braking machine 14' and laid in the direction S2 by means of the winch machine 15'.

Figure 2:
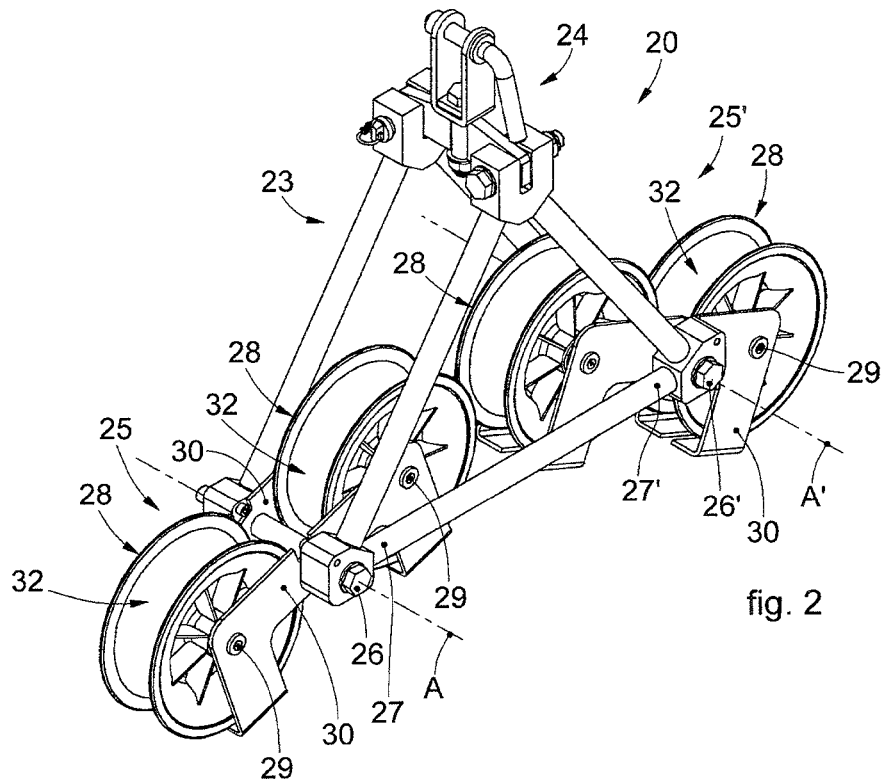
FIG. 2 is a three-dimensional view of a single roller unit for laying cables according to the invention.

The roller unit 20, see in particular FIG. 2, comprises a frame 23 which can be attached, by means of suitable connection means 24, to the support element 18 positioned on the intermediate support 17.

A first slider 25 and a second slider 25' are positioned on the frame 23, in particular the sliders 25 and 25' are hinged to the frame 23 so as to define respective axes of rotation A, A', for example by means of a rotation pin 26, 26'.

The sliders 25 and 25' are aligned, for example parallel to one of the laying directions S1 or S2 and therefore able to accommodate one of the cables 11, 12, 13 in a suitable manner.

In particular, the axes of rotation A, A' of the sliders 25, 25' are positioned in proximity to opposite ends 27, 27' of such frame 23.

Each of the sliders 25, 25' is associated with at least one pair of wheels 28 on which a cable 11, 12, 13 to be laid lies, in particular idle wheels 28 hinged to the sliders 25, 25', for example by means of corresponding rotation pins 29.

The sliders 25, 25' can for example provide a pair of support frames 30, 30', parallel and suitably shaped, between which the wheels 28 are hinged.

Figure 3:
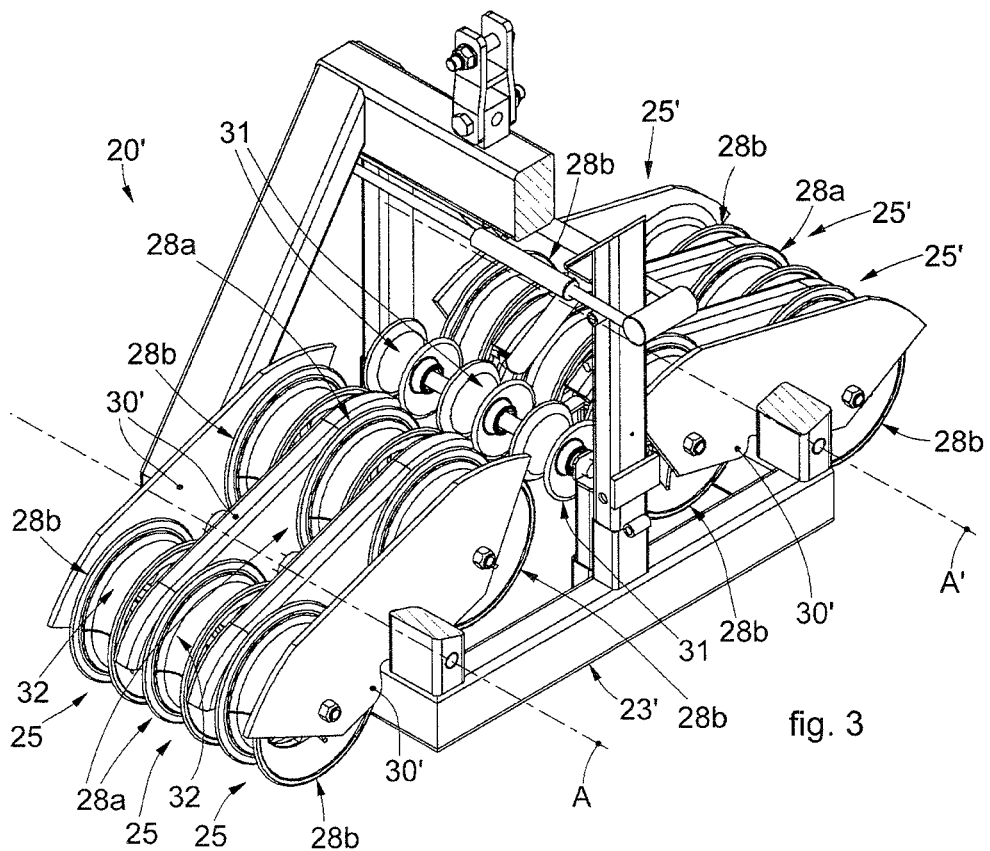
FIG. 3 is a three-dimensional view of a multiple roller unit for laying cables.
Figure 4:
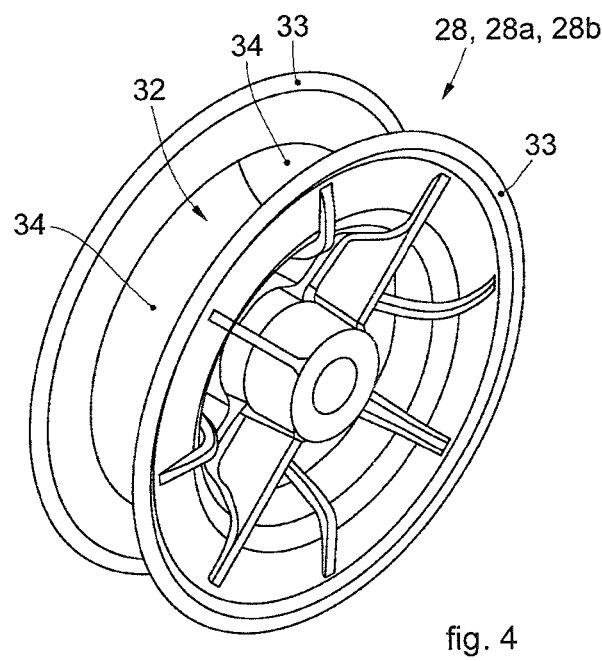
FIG. 4 is a three-dimensional view of a wheel of the present roller unit for laying cables.
Figure 5:
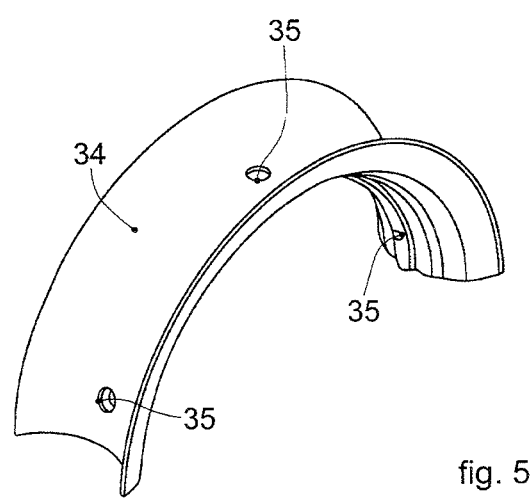
FIG. 5 is a three-dimensional view of an interchangeable sector for the wheel of the present roller unit.

FIG. 3 shows a variant of the present roller unit 20' provided with a corresponding frame 23'. In this variant, the roller unit 20' comprises a plurality of pairs of aligned sliders 25, 25', for example three pairs of sliders 25, 25' aligned for example along the laying directions S1 or S2 of FIG. 1.

It is possible to provide, for example, that the towing cable 12 is positioned along the wheels 28a of the pair of central sliders 25, 25', while the conductors 11 are positioned on the wheels 28b of the pairs of lateral sliders 25, 25'.

Between the pairs of sliders 25, 25' it is possible to provide at least one other laying wheel 31 with an earthing function, thanks to the resting of the cable 11, 12, 13 which can be achieved for example with suitable preloaded springs. Naturally, the other wheel 31 can also be provided for the roller unit 20 of FIG. 2.

The wheels 28, 28a, 28b are provided with an annular groove 32 to support the cables delimited by containing wings 33 and able to define a contact and sliding surface of at least one of said cables 11, 12, 13.

The annular support groove 32 is made of a material of great hardness and low rolling friction: in the case of plastic materials we consider a minimum hardness of 90 Shore D (dry as molded) or 75 Shore D (conditioned at 23° C. and 50% relative humidity) and an elastic modulus not lower than 5000 Mpa (dry as molded); in the case of metal materials we consider a minimum hardness of 210 HB. The annular support groove 32 can be made of a technoplastic material with a polyamide (PA) base, for example polyamide PA66 reinforced with glass fiber, in the case where the supported cable is a conductor 11 or 13, while it can be made of a metal material with great hardness, in particular pearlitic-ferritic lamellar cast iron GJ250, in the case where the supported cable is a towing cable 12.

The fiberglass-reinforced polyamide material, which can be used on the wheels where the conductors slide, has proved to be particularly resistant and able to withstand even high speeds of rotation of the wheel 28, 28a, 28b, thus allowing adequate support of the conductor 11 or 13, even for prolonged periods of use of the roller unit 20 or 20'.

Preferably, the technoplastic material with polyamide (PA) base is reinforced with a percentage of glass fiber variable between 20% and 40% in weight and preferably equal to about 30%.

The metal material with great hardness, in particular pearlitic-ferritic lamellar cast iron GJL250, which can be used on multiple roller units only on the central wheels where the towing cables slide, characterized by an irregular and highly abrasive surface, has proved to be particularly resistant and able to withstand even high speeds of rotation of the wheel 28a, thus allowing adequate support of the towing cable 12, even for prolonged periods of use of the roller unit 20 or 20'.

In order to allow the possible replacement thereof, the annular groove 32 of the wheels 28, 28a, 28b is made of or covered by a plurality of interchangeable sectors 34 which encircle and are attached in a removable manner to the wheel 28, 28a, 28b. The sectors 34 are made of the technoplastic material with polyamide (PA) base, reinforced with glass fiber, or of the metal material with great hardness, in particular pearlitic-ferritic lamellar cast iron GJ250.

The interchangeable sectors 34 can therefore be attached to the circular surface of the wheel 28, 28a, 28b by means of any suitable removable attachment element, such as screws, bolts or other, and for this purpose can provide through holes 35 able to accommodate the removable attachment elements.

The interchangeability of the possibly worn sectors 34, by means of simple operations to remove and replace the removable attachment elements, allows an extreme flexibility of use of the roller units 20, 20' and the possibility to always use them with the best possible surface. This fact improves the efficiency of the roller units 20, 20' and reduces the possibility of making, on the external layer of the cable 11, 12, 13, in particular the conductors 11 and more in particular for conductors of the HTLS type, possible traces of abrasion or crushing resulting from a surface that is not perfectly smooth and homogeneous.

In particular, a particularly convenient configuration which allows a rapid replacement of the interchangeable sectors can provide two interchangeable sectors 34 of a semicircular shape which, once assembled on the wheel 38, form the annular groove 32. Naturally, it would in any case be possible to provide also a different number of interchangeable sectors 34.

In the multiple roller unit 20', it is possible to provide that the annular grooves 32 of the wheels 28a of the pair of central sliders 25, 25' are made of this metal material with great hardness, in particular pearlitic-ferritic lamellar cast iron GJ250, while the annular grooves 32 of the wheels 28b of the pairs of lateral sliders 25, 25' which support respective conductors 11 are made of or covered by the technoplastic material with a polyamide (PA) base, reinforced with glass fiber.

This configuration has proved to be particularly effective in the case of multiple roller units 20', since the pair of sliders 25, 25' with wheels made of said metal material with great hardness, in particular pearlitic-ferritic lamellar cast iron GJ250, withstands better the loads of the towing cable 12, therefore there are no indentation phenomena or impressions on the surface of the annular groove 32. On the other hand, for the conductors 11 the annular grooves 32 made of or covered by the technoplastic material with a polyamide (PA) base and reinforced with glass fiber are more effective, since possible phenomena of indentation and formation of impressions on the sliding surfaces are more limited for conductors.

Between the pair of sliders 25, 25' of the roller unit 20 or of the roller unit 20' it is possible, as we said, to provide at least one further laying wheel 31 with an earthing function.

The wheel 31 is provided with an annular groove made of or covered by a conductive material, such as pure aluminum or more advantageously aluminum alloy.

The present roller unit 20 and 20' is therefore extremely resistant and flexible in use, since the wheels 28, 28a, 28b provided in the sliders 25, 25' provide annular grooves 32 which are made of or covered by a material of great hardness and low rolling friction, for example by interchangeable sectors 34. This material can be a technoplastic material with polyamide (PA) base reinforced with glass fiber, when used to support conductors, while they are covered by metal material of great hardness, in particular pearlitic-ferritic lamellar cast iron GJ250, when used to support a towing cable.

The present roller unit 20, 20' can advantageously allow the self-alignment of the two sliders 25, 25' according to the required configuration, and allows to minimize the effects of the passage of elements that comprise the kinematic chain of the stretching system, such as fixed or balanced returns, for example the return device 22, rotatable joints and sock joints, which have different material sections from the bundle of conductors, with elements even with much larger sizes, and therefore which affect the equilibrium situation of the suspended roller unit 20, 20'.

Furthermore, the present roller unit 20 allows to maintain the four wheels 28, 28a, 28b of each pair of sliders 25, 25' always in contact, thanks to the self-alignment, with the cables 11, 12, 13, while the roller unit 20' with several pairs of multiple adjacent sliders 25, 25' behaves in fact like a pulley, where the contact angle, and therefore the number of wheels 28a, 28b in contact with the cables 11, 12, 13, can vary as a function of the geometric configuration of the conductor itself in the span.

Figure 7:
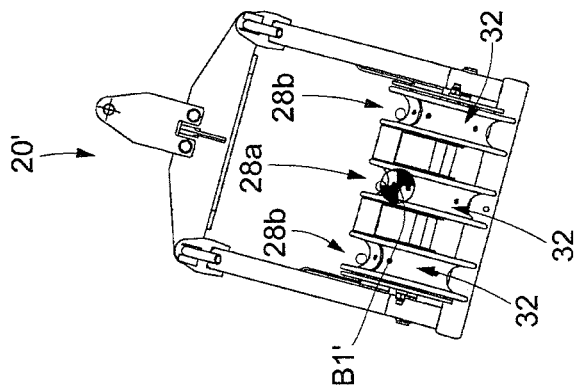
FIG. 7 is a schematic front view of a part of the multiple roller unit of FIG. 3.
Figure 7A:
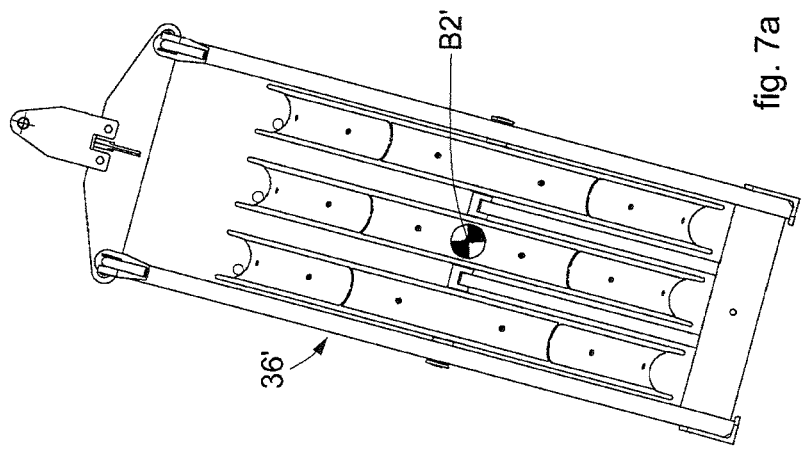
FIG. 7a is a schematic front view of a traditional multiple pulley for laying cables.
Figure 6:
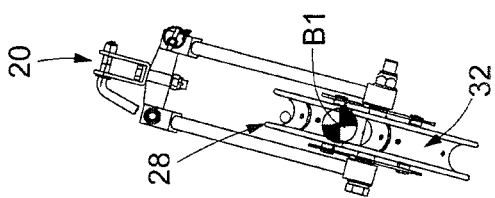
FIG. 6 is a schematic front view of a part of a single roller unit for laying cables of FIG. 2.
Figure 6A:
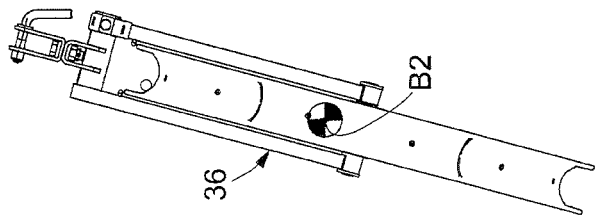
FIG. 6a is a schematic front view of a traditional single pulley for laying cables.

Another considerable advantage of the present roller unit 20, 20' is that the weights are contained to much smaller to values compared with a pulley of equivalent diameter, see for example the simple pulley 36 of FIG. 6a, or the multiple pulley 36' of FIG. 7a.

The roller units 20 and 20', see also FIG. 6 and FIG. 7, if compared respectively with the pulleys 36 and 36', have smaller weights and bulks, greater logistic ease of movement and assembly, but also and above all a position of the center of gravity B1, B1' that is much closer to the cable 11, 12, 13 laid and stretched with respect to the centers of gravity B2, B2' of the traditional pulleys 36, 36'.

The roller unit 20, 20' according to the invention is also very advantageous, as mentioned, when laying HTLS (High Temperature Low Sag) conductors, that is, the latest generation conductors suitable to work at much higher temperatures than a traditional ACSR conductor (from 80° C. to 150-220° C.) with the same sag, that is when loaded. These conductors are characterized by cores made of unconventional materials (composites, invar steel or other) and layers of conductor characterized by annealed aluminum, therefore very pure and very conductive, or non-conventional aluminum alloys, such as aluminum-zirconium, characterized by very low surface hardness, and therefore extreme ease of damage compared to traditional conductors. Any method or device that minimizes the stresses on the conductor and therefore allows its integrity to be preserved is therefore indispensable, and the present roller units 20, 20' advantageously and effectively adapt to the characteristics of these conductors.

HTLS conductors are also characterized by higher winding ratios compared to a traditional conductor, going from the traditional value of 20 to 24, 28, 30 or even more in determinate cases, therefore, with the diameter of the conductor remaining the same, it would be necessary to have pulleys with a diameter not available on the market, or that could be produced only with unacceptable weights, sizes and costs.

Therefore, the present roller units 20, 20' prove to be very advantageous also for use in laying HTLS conductors, since, among others reasons, they allow to achieve high radii of curvature even with limited bulks and weights.

It is clear that modifications and/or additions of parts may be made to the roller unit for laying cables as described heretofore, without departing from the field and scope of the present invention.

It is also clear that, although the present invention has been described with reference to some specific examples, a person of skill in the art shall certainly be able to achieve many other equivalent forms of roller unit for laying cables, having the characteristics as set forth in the claims and hence all coming within the field of protection defined thereby.

In the following claims, the sole purpose of the references in brackets is to facilitate reading and they must not be considered as restrictive factors with regard to the field of protection claimed in the specific claims.

The invention claimed is:

1. Roller unit for laying cables (11, 12, 13), comprising a frame (23, 23') where at least one pair of sliders (25, 25') are positioned, disposed in sequence and aligned parallel to a laying direction (S1, S2) of the cables (11, 12, 13), wherein said sliders (25, 25') are each provided with at least one pair of wheels (28, 28a, 28b) supporting a cable (11, 12, 13) to be laid, and wherein said sliders (25, 25') are hinged to said frame (23, 23') and rotatable around respective axes of rotation (A, A') so as to vary the inclination thereof with respect to said frame (23, 23') and therefore to vary the radius of curvature of the cable (11, 12, 13) supported, said roller unit being characterized in that said wheels (28, 28a, 28b) are provided with an annular groove (32) to support the cables, delimited by containing wings (33) and able to define a contact and sliding surface of at least one of said cables (11, 12, 13), wherein at least said annular support groove (32) is made of or covered by a material of great hardness and low rolling friction, said minimum hardness being equal to 90 Shore D (dry as molded) or 75 Shore D (conditioned at 23° C. and 50% relative humidity) and an elastic modulus not lower than 5000 Mpa (dry as molded) in the case of thermoplastic material, said annular groove (32) of said wheels (28, 28a, 28b) is made of or covered by a plurality of interchangeable sectors (34) made of said material with great hardness and low rolling friction.

2. Roller unit as in claim 1, characterized in that said annular groove (32) is made of or covered by a technoplastic material with a polyamide (PA) base reinforced with glass fiber, if the supported cable is a conductor (11, 13).

3. Roller unit as in claim 2, characterized in that said technoplastic material with polyamide (PA) base is reinforced with a percentage of glass fiber varying between 20% and 40% in weight and preferably equal to about 30%.

4. Roller unit as in claim 1, characterized in that it comprises two interchangeable sectors (34) of semicircular shape which, once assembled on the wheel (28, 28a, 28b), form or cover said annular groove (32).

5. Roller unit as in claim 1, characterized in that it comprises a plurality of pairs of sliders (25, 25') disposed adjacent, wherein each pair of said sliders (25, 25') is aligned parallel to a laying direction (S1, S2) and is able to support at least one cable (11, 12, 13) to be laid.

6. Roller unit as in claim 5, characterized in that it comprises three or five pairs of aligned sliders (25, 25'), wherein the wheels (28a) of the pair of central sliders (25, 25') support a towing cable (12) and the wheels (28b) of the pairs of lateral sliders (25, 25') support respective conductors (11).

7. Roller unit as in claim 6, characterized in that the annular grooves (32) of the wheels of said pair of central sliders (25, 25') are made of or covered by pearlitic-ferritic lamellar cast iron GJL250, while the annular grooves (32) of the wheels (28b) of the pairs of lateral sliders (25, 25') which support respective conductors (11) are made of or covered by said technoplastic material with polyamide (PA) base reinforced with glass fiber.

8. Roller unit as in claim 1, characterized in that it comprises, between said pair of sliders (25, 25'), at least one other laying wheel (31) with an earthing function and provided with an annular groove (32) made of or covered by a conductive material, in particular pure aluminum or preferably aluminum alloy.

9. Plant for laying cables, comprising at least a winch machine (15, and at least a braking machine (14, 14') positioned on opposite sides with respect to one or more intermediate supports (17), on which one or more roller units (20, 20') for laying cables according to claim 1 are positioned.

10. Roller unit for laying cables (11, 12, 13), comprising a frame (23, 23') where at least one pair of sliders (25, 25') are positioned, disposed in sequence and aligned parallel to a laying direction (S1, S2) of the cables (11, 12, 13), wherein said sliders (25, 25') are each provided with at least one pair of wheels (28, 28a, 28b) supporting a cable (11, 12, 13) to be laid, and wherein said sliders (25, 25') are hinged to said frame (23, 23') and rotatable around respective axes of rotation (A, A') so as to vary the inclination thereof with respect to said frame (23, 23') and therefore to vary the radius of curvature of the cable (11, 12, 13) supported, said roller unit being characterized in that said wheels (28, 28a, 28b) are provided with an annular groove (32) to support the cables, delimited by containing wings (33) and able to define a contact and sliding surface of at least one of said cables (11, 12, 13), wherein at least said annular support groove (32) is made of or covered by a material of great hardness and low rolling friction, said minimum hardness being equal to 210 HB in the case of a metal material, said annular groove (32) of said wheels (28, 28a, 28b) is made of or covered by a plurality of interchangeable sectors (34) made of said material with great hardness and low rolling friction.

11. Roller unit as in claim 10, characterized in that said annular groove (32) is made of or covered by a metal material of great hardness, in particular pearlitic-ferritic lamellar cast iron GJL250, if the supported cable is a towing cable (12).

* * * * *